United States Patent
Hsu et al.

(10) Patent No.: US 7,457,213 B2
(45) Date of Patent: Nov. 25, 2008

(54) WRITE SIGNAL GENERATOR WITH DELAY CALIBRATION

(75) Inventors: Tse-Hsiang Hsu, Hsinchu (TW); Chih-Cheng Chen, Hsin Chu (TW)

(73) Assignee: Mediatak Inc., Hsin Chu (TW)

( * ) Notice: Subject to any disclaimer, the term of this patent is extended or adjusted under 35 U.S.C. 154(b) by 891 days.

(21) Appl. No.: 10/868,952

(22) Filed: Jun. 17, 2004

(65) Prior Publication Data

US 2004/0257949 A1 Dec. 23, 2004

(30) Foreign Application Priority Data

Jun. 20, 2003 (TW) .............................. 92116882 A

(51) Int. Cl.
*G11B 15/52* (2006.01)

(52) U.S. Cl. ................................. 369/47.28; 369/53.34

(58) Field of Classification Search ....................... None
See application file for complete search history.

(56) References Cited

U.S. PATENT DOCUMENTS 6,445,661 B1 9/2002 Wu

*Primary Examiner*—Paul Huber
(74) *Attorney, Agent, or Firm*—Muncy, Geissler, Olds & Lowe, PLLC

(57) ABSTRACT

An aligned write signal generator with alignment calibration utilizes an alignment unit to align a plurality of write signal. The aligned write signal generator includes a write signal generator for receiving an EFM signal and converting the EFM signal into a plurality of write signals according to a write strategy waveform generating rule, an alignment unit for receiving the plurality of write signals, aligning the write signals and outputting phase adjusted write signals, and a phase calibration unit for receiving the phase adjusted write signals, detecting phase error between the phase adjusted write signals, and outputting phase control signals. The alignment unit further receives the phase control signals to adjust the delay time of each write signal.

14 Claims, 9 Drawing Sheets

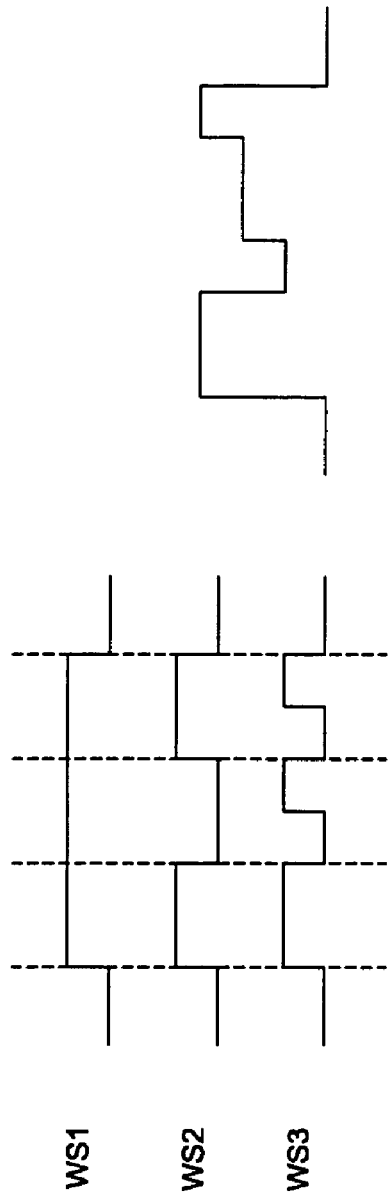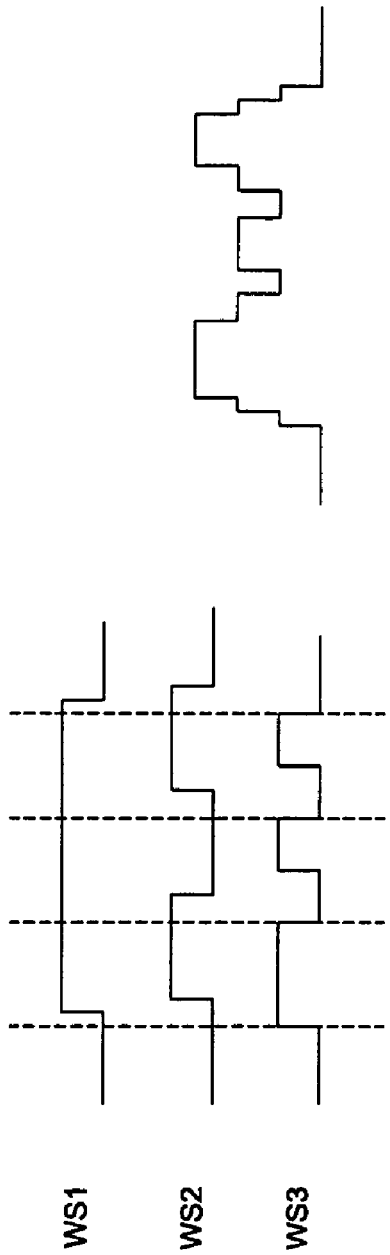

WRITE SIGNAL GENERATOR WITH DELAY CALIBRATION

This application claims the benefit of the filing date of Taiwan Application Ser. No. 092116882, filed Jun. 20, 2003, the content of which is incorporated herein by reference.

BACKGROUND OF THE INVENTION

1. Field of the Invention

The invention relates to a write signal generator in an optical disk drive, and more particularly to an aligned write signal generator with delay calibration in an optical disk drive utilizing an alignment unit to align the write signals with each other in time.

2. Description of the Related Art

FIG. 1 illustrates a block diagram of a laser power control system in a conventional optical disk drive. Referring to FIG. 1, the laser power control system 10 includes an EFM (Eight-to-Fourteen Modulation) encoder 11, a write signal generator 12, a LD driver (Laser diode driver) 13, and a LD (Laser Diode) 14. The EFM encoder 11 receives the input data and generates the EFM signal according to the EFM encoding rule. The write signal generator 12 receives the EFM signal and converts the EFM signal into a plurality of write signals, e.g. three write signals WS1, WS2, WS3 as shown in FIG. 1, according to the write strategy waveform generating rule. The write signal generator 12 typically includes a write strategy pulse generator 121, a flip-flop unit 122, and a write signal calculator 123. The LD driver 13 receives the plurality of write signals and integrates them into a drive signal to drive the LD 14. How the write signal generator 12 converts the EFM signal into a plurality of write signals according to the write strategy waveform generating rule is a well-known art in this filed and can be found in U.S. Pat. No. 6,445,661, so detailed descriptions thereof will be omitted.

Along with increase in write speed of the optical disk drive, the timing accuracy among the write signals becomes more critical. Correspondingly, the problems of the waveform deformation caused by the digital logic gate, buffer, and output driver within the write signal generator also become more serious owing to, for example, the different delay time among the write signals. FIG. 2 shows the ideal waveforms of three write signals and the corresponding drive signal, wherein FIG. 2A shows three write signals generated by an ideal write signal generator, and FIG. 2B shows the drive signal generated by the LD driver. Because the three write signals WS1, WS2 and WS3 are not deformed, the drive signal generated by the LD driver is consequently quite ideal.

FIG. 3 shows the deformed write signals and the corresponding drive signal, wherein FIG. 3A shows three write signals generated by the write signal generator 12, and FIG. 3B shows the drive signal generated by the LD driver. As shown in FIG. 3, because the three write signals WS1, WS2 and WS3 are not aligned in phase (or say, not aligned in time), the drive signal generated by the LD driver is seriously deformed. If the optical disk drive outputs such a deformed drive signal to the LD 14, the data may not be recorded in the optical disk in a proper format, thereby causing data error when one tries to reproduce the data in the optical disk. Therefore, it is an important subject to provide phase adjusted write signals.

SUMMARY OF THE INVENTION

In view of the above-mentioned problems, an object of the invention is to provide an aligned write signal generator capable of aligning the write signals in time, wherein the device calibrates the phase delays between the write signals in advance, and then adjusts the delay time of each write signal to align the phase of the write signals.

To achieve the above-mentioned object, the aligned write signal generator of the invention includes a write signal generator for receiving the EFM signal and converting the EFM signal into a plurality of write signals according to a write strategy waveform generating rule, an alignment unit for receiving the plurality of write signals, aligning the phase of the write signals, and outputting a plurality of phase adjusted write signals, and a phase calibration unit for receiving the phase adjusted write signals outputted from the alignment unit, detecting phase differences between the phase adjusted write signal, and outputting phase control signals. The alignment unit further receives the phase control signals to adjust the delay time of each write signal.

BRIEF DESCRIPTION OF THE DRAWINGS

FIG. 2A shows ideal write signals.

FIG. 2B shows a drive signal generated by the LD driver according to the write signals in FIG. 2A.

FIG. 3A shows deformed write signals.

FIG. 3B shows a drive signal generated by the LD driver according to the write signals in FIG. 3A.

DETAILED DESCRIPTION OF THE INVENTION

The aligned write signal generator with alignment calibration in an optical disk drive of the present invention will be described with reference to the accompanying drawings.

The conventional laser power control system utilizes the write signal generator to generate a plurality of write signals and then directly outputs them to the LD driver without the process of detecting whether the write signals are aligned in phase (or equivalently, in time) or not. Usually, a conventional write signal generator will introduce different phase delay to different write signal due to the different signal processing path. In order to solve this problem, the invention utilizes a phase calibration unit to detect the phase differences (or equivalently, the delay differences) between the write signals, and an alignment unit to adjust the phase (or equivalently, the time delay) of the write signals, such that the write signals outputted to the LD driver are substantially aligned in phase.

Figure 1:
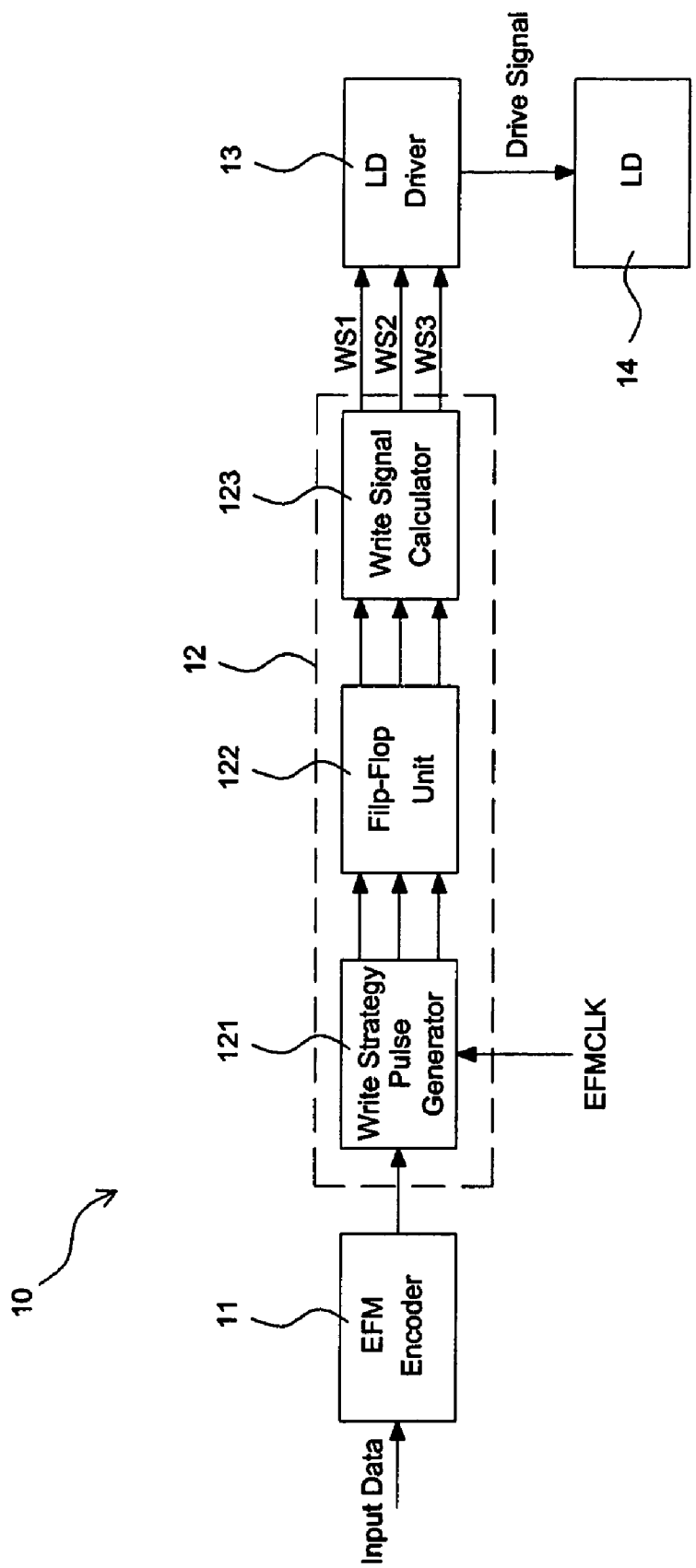
FIG. 1 illustrates a block diagram of a laser power control system in a conventional optical disk drive.
Figure 4:
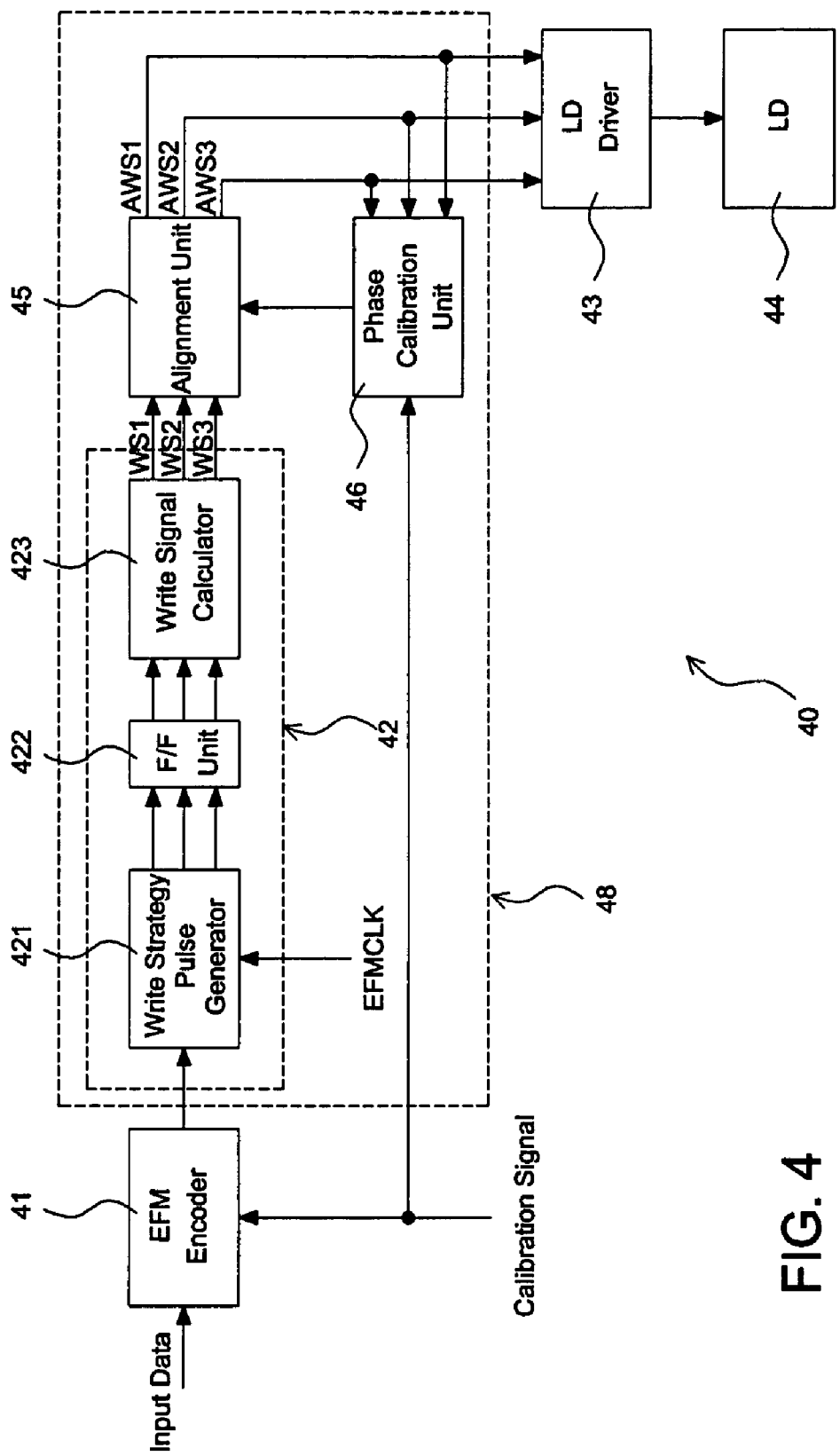
FIG. 4 illustrates a block diagram of a laser power control system containing an aligned write signal generator according to the present invention.

FIG. 4 illustrates a block diagram of a laser power control system 40 with an aligned write signal generator 48 of the present invention. The laser power control system 40 includes an EFM encoder 41, an aligned write signal generator 48, a LD driver 43 and a LD 44. The aligned write signal generator 48 includes a write signal generator 42, an alignment unit 45 and a phase calibration unit 46. The EFM encoder 41 receives the input data and generates the EFM signal according to the EFM encoding rule. The write signal generator 42 receives the EFM signal and converts the EFM signal into a plurality of write signals, e.g. three write signals WS1, WS2 and WS3 as shown in this embodiment, according to the write strategy waveform generating rule. The alignment unit 45 receives the write signals WS1, WS2 and WS3, respectively delays the write signals WS1, WS2 and WS3, and generating phase adjusted write signals AWS1, AWS2 and AWS3 for output. A LD driver 43 receives the phase adjusted write signals AWS1, AWS2 and AWS3 and generates a drive signal to drive a LD 44. The architectures and functions of the write signal generator 42, the LD driver 43, and the LD 44 are the same as those of the prior art, and detailed descriptions thereof will be omitted. The phase calibration unit 46 receives and detects the phase errors of the phase adjusted write signals AWS1, AWS2 and AWS3 during calibration mode, and outputs phase control signals to the alignment unit 45.

The aligned write signal generator 48 of the invention has two operation modes, including a calibration mode and a normal mode. In the calibration mode, the phase error between the write signals are calibrated before the laser power control system 40 starts to write. The normal mode is the general write mode of the aligned write signal generator 48. When the aligned write signal generator 48 is in the normal mode, the phase calibration unit 46 is disabled and the alignment unit 45 is utilized to delay each write signal according to the delay setting obtained in the calibration mode so as to align the phase of these write signals.

When the aligned write signal generator 48 is in the calibration mode, the phase calibration unit 46 is enabled and receives the phase adjusted write signals AWS1, AWS2 and AWS3, detects the phase errors among the phase adjusted write signals, and then generates the phase control signals. The alignment unit 45 adjusts the delay time of each write signal according to the phase control signals.

Figure 5:
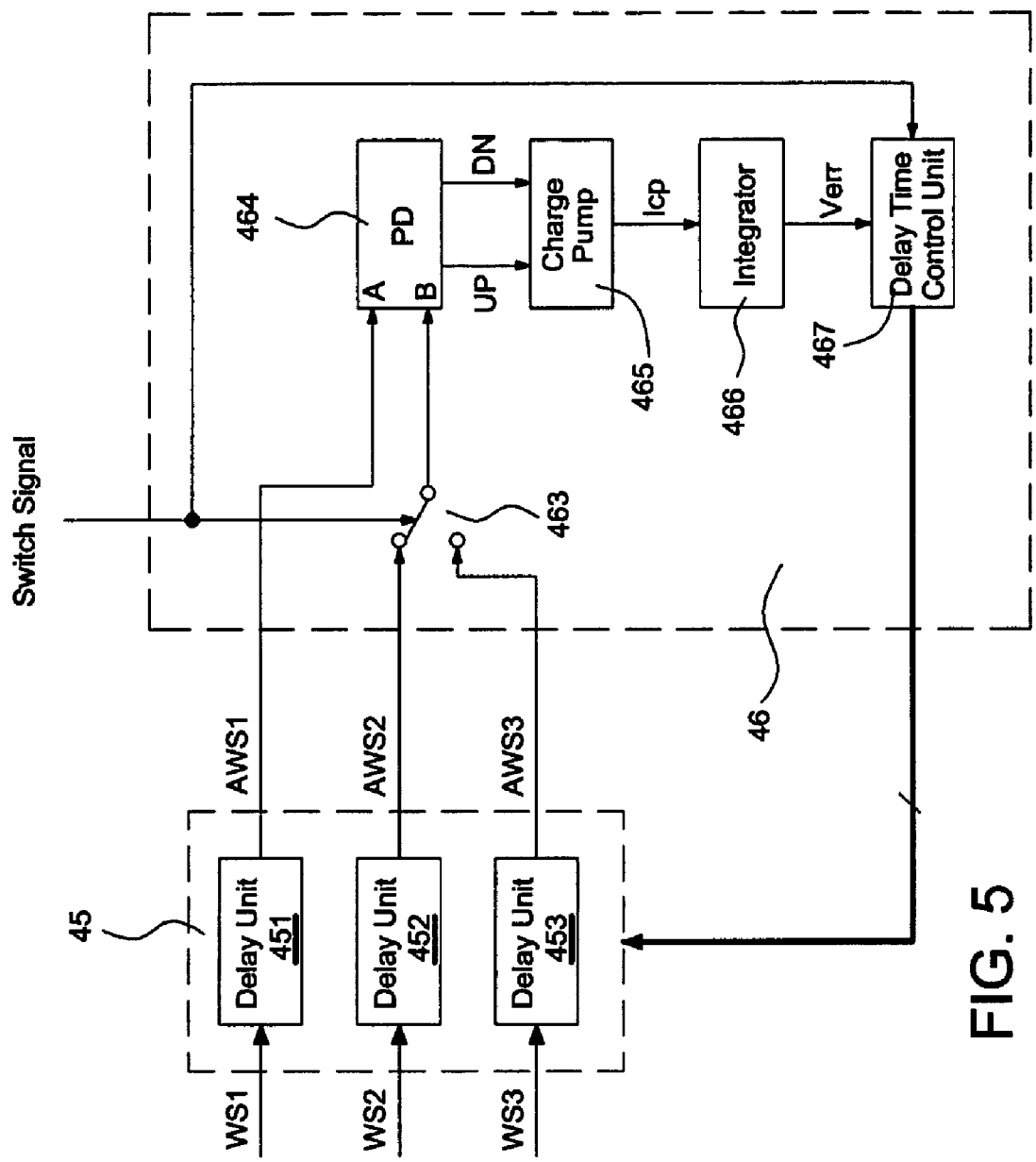
FIG. 5 illustrates a block diagram of an alignment unit and a phase calibration unit of FIG. 4 according to a first embodiment of the invention.

FIG. 5 illustrates a block diagram of an alignment unit and a phase calibration unit of FIG. 4 according to a first embodiment of the present invention. Referring to FIG. 5, the alignment unit 45 includes three delay units 451, 452 and 453 for respectively receiving the write signals WS1, WS2 and WS3. Each delay unit delays the write signal and outputs the phase adjusted write signal. The number of delay units contained in the alignment unit 45 is determined according to the number of write signals outputted from the write signal generator 42.

Referring again to FIG. 5, the phase calibration unit 46 includes a switch 463, a PD (phase detector) 464, a charge pump 465, an integrator 466, and a delay time control unit 467. The phase calibration unit 46 detects the phase error between two selected write signals, and outputting the phase control signals to the alignment unit 45. The phase detector 464 receives the phase adjusted write signal AWS1 and one of the phase adjusted write signals AWS2 and AWS3 outputted from the switch 463. Because the phase detector 464 detects the phase error between two input signals and outputs a detection signal, the phase calibration unit 46 utilizes the switch 463 to switch the phase adjusted write signals AWS2 and AWS3 according to a switch signal.

The PD 464 detects the phase error between a first input signal A and a second input signal B and outputs control signals UP and DN to control the charge pump 465 according to the phase error, wherein the first input signal A is the phase adjusted write signal AWS1, and the second input signal B is the signal outputted from the switch 463. If the phase of the first input signal A leads that of the second input signal B, the pulse width of the control signal UP is larger than the pulse width of the control signal DN. Thereby the charge pump 465 generates a positive control current Icp. On the contrary, if the phase of the first input signal A lags behind that of the second input signal B, the pulse width of the control signal UP is smaller than the pulse width of the control signal DN. Thereby the charge pump 465 generates a negative control current Icp. The calibration circuit utilizes the integrator 466 to integrate the control current Icp and then to output an error voltage Verr. The delay time control unit 467 generates the phase control signals for adjusting the delay time of each delay unit of the alignment unit 45 according to the error voltage Verr.

Figure 6:
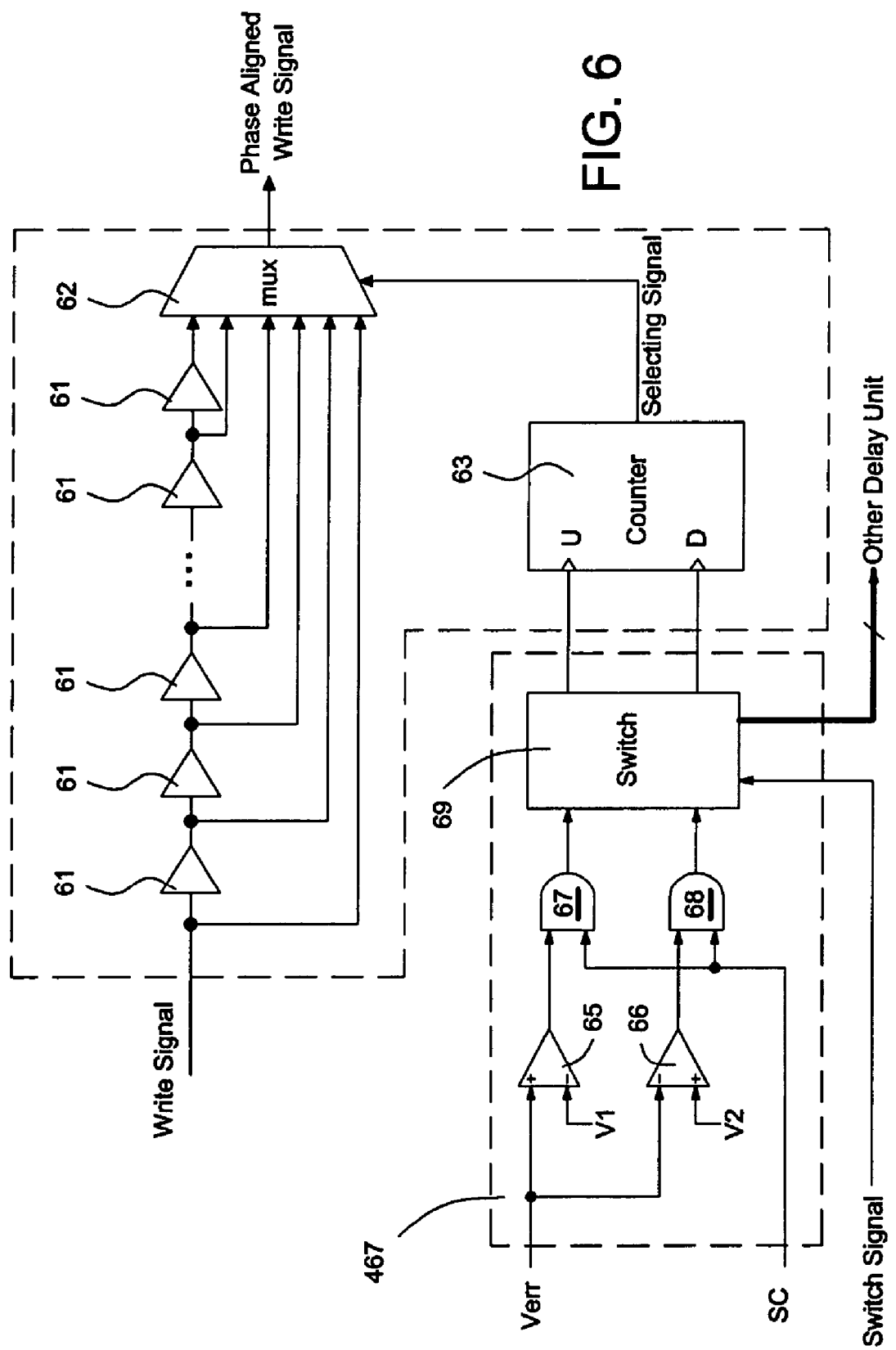
FIG. 6 illustrates a block diagram of the delay unit and the delay time control unit of FIG. 5.

FIG. 6 illustrates a block diagram of the delay unit and the delay time control unit 467 of FIG. 5. As shown in FIG. 6, the delay unit 451 (452, 453) is composed of a plurality of serially connected delay cells 61, a multiplexer 62, and a counter 63. The delay cells 61 receive the write signal, generate a plurality of delayed signals with different delay time, and output the delayed signals to the multiplexer 62. The multiplexer 62 selects one of the delayed signals for output according to the selecting signal (delay time) outputted by the counter 63. The counter 63 outputs the count value as the selecting signal. Consequently, the delay time of the delay unit may be changed according to the count value of the counter 63.

The delay time control unit 467 includes comparators 65 and 66, AND gates 67 and 68, and a switch 69. The comparator 65 compares the error voltage Verr with a first reference voltage V1 and generates a first comparison signal. The comparator 66 compares the error voltage Verr with a second reference voltage V2 and generates a second comparison signal. The AND gate 67 receives a trigger clock SC and the first comparison signal to generate an up-counting signal. The AND gate 68 receives the trigger clock SC and the second comparison signal to generate a down-counting signal. The switch 69 receives the up-counting signal and the down-counting signal for outputting the up-counting signal and down-counting signal as the phase control signals to the counter 63 in one of the delay units according to the switch signal. The counter 63 counts the pulse number of the up-counting signal and the down-counting signal as the delay time. Consequently, according to the architecture of FIG. 6, when the error voltage Verr is higher than the first reference voltage V1, it means that the first input signal A leads the second input signal B. So, the AND gate 67 will generate a pulse in the up-counting signal at each rising edge of the trigger clock, therefore the counter will up-count in order to increase the delay time of signal B. Alternatively, when the error voltage Verr is lower than the second reference voltage V2, it means that the first input signal A lags behind the second input signal B. So, the AND gate 68 will generate a pulse in the down-counting signal at each rising edge of the trigger clock, therefore the counter will down-count in order to decrease the delay time of signal B. Of course, the delay unit shown in FIG. 6 is just one of the embodiments, other embodiments of the delay unit capable of achieving the function are also fully supported by the present invention.

In addition, when the phase calibration unit calibrates the phase error of the write signals WS1 and WS2, the phase control signals containing the up-counting signal and the down-counting signal are outputted to the counter in the delay unit 452 through the switch 69 according to the switch signal. When the phase calibration unit calibrates the phase error of the write signals WS1 and WS3, the phase control signals containing the up-counting signal and the down-counting signal are outputted to the counter in the delay unit 453 through the switch 69 according to the switch signal. The switch 69 may be a pure switch or a de-multiplexer. In the embodiment of FIG. 5, the delay time of each of the write signals WS2 and WS3 are adjusted on the basis of the write signal WS1. Because the phase of the write signals WS2 and WS3 may lead or lag behind the write signal WS1, it is preferable to set the count values of the counters in the delay units 451 of the alignment unit 45 to one half of the maximum count value. By choosing one of the write signals as reference, it needs only to adjust the delay time (count values) of the delay units associated with the other write signals to achieve alignment among all the write signals. Furthermore, the counter in the delay unit may be a counter with a reload function and the counter is reloaded an initial value at the beginning of calibration.

Figure 7:
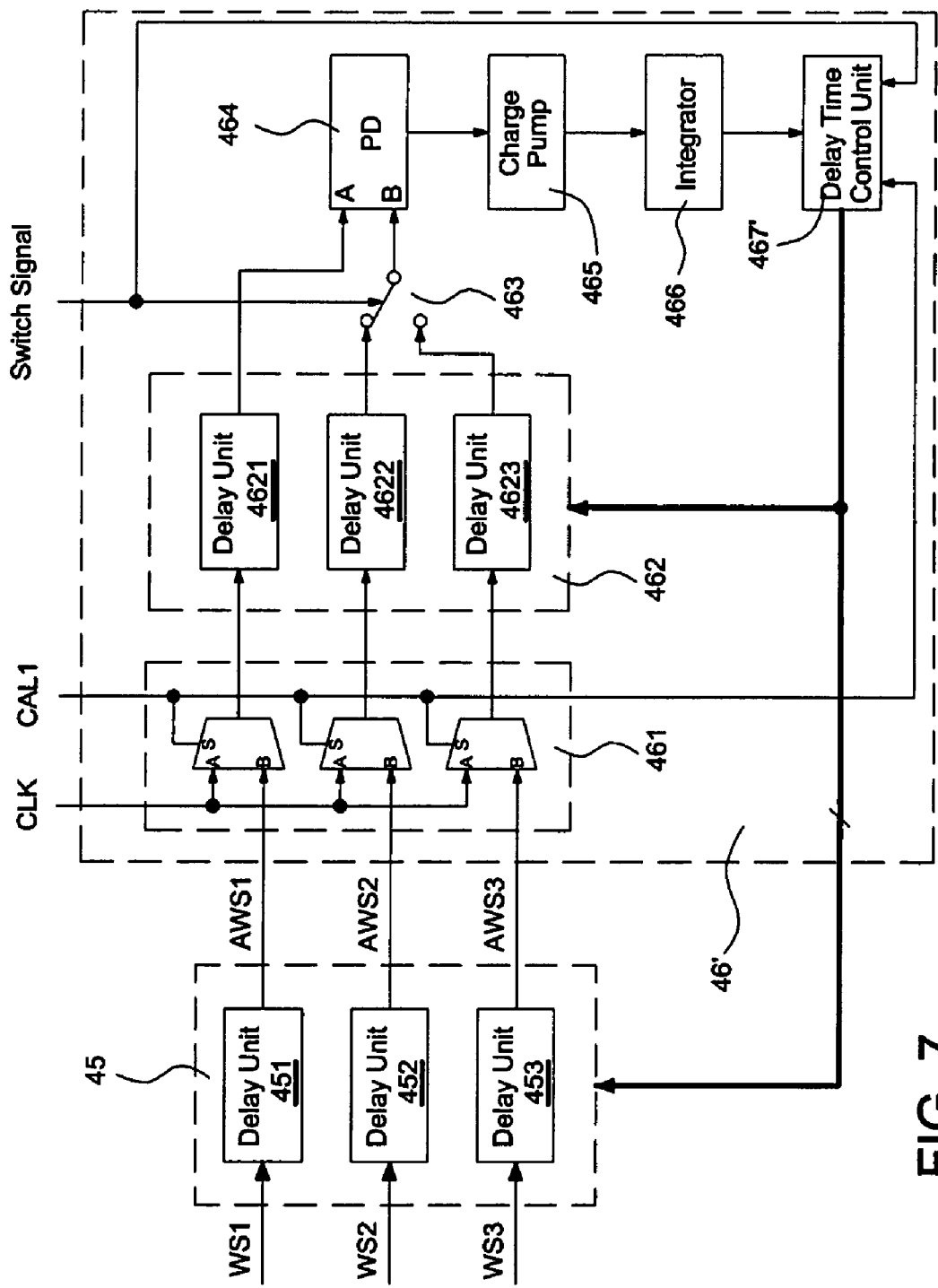
FIG. 7 illustrates a block diagram of the alignment unit and the phase calibration unit of FIG. 4 according to a second embodiment of the invention.

FIG. 7 illustrates a block diagram of the alignment unit 45 and the phase calibration unit 46 of FIG. 4 according to a second embodiment of the present invention. In the first embodiment, the aligned write signal generator 48 utilizes the phase calibration unit 46 to calibrate the phase error between the write signals WS1, WS2 and WS3, which are inputted to the first alignment unit 45, without considering the delay error caused by the phase calibration unit 46 itself. In view of this, in addition to a switch 463, a PD 464, a charge pump 465, an integrator 466, and a delay time control unit 467', the phase calibration unit 46' of the second embodiment further includes a multiplexer module 461 and a second alignment unit 462, and utilizes the multiplexer module 461 and the second alignment unit 462 for calibrating the delay error caused by the phase calibration unit 46' itself. After the delay calibration of the phase calibration unit 46' is finished, the phase error of the write signals WS1, WS2 and WS3 are calibrated as in the first embodiment.

The multiplexer module 461 includes three multiplexers for selecting the phase adjusted write signals AWS1, AWS2, AWS3 or the calibration clock CLK to output. The second alignment unit 462, which is the same as the first alignment unit 45, also includes three delay units 4621, 4622 and 4623 for respectively delaying the output signals of the multiplexer module 461. When the circuit calibrates the delay error of the phase calibration unit 46', the control signal CAL1 is enabled to make the multiplexer module 461 output the calibration clock CLK to the second alignment unit 462. Thereafter, the phase calibration unit 46' utilizes the loop, including the second alignment unit 462, the PD 464, the charge pump 465, the integrator 466, and the delay time control unit 467', to calibrate the delay error due to the phase calibration unit 46', especially caused by the switch 463. The delay time of each delay unit of the second alignment unit 462 is adjusted in a way similar that described in FIG. 6. In the example given in FIG. 7, once the delay units of the second alignment unit 462 are well adjusted, the path delay of the following paths: the path from signal AWS1 input of the phase calibration unit 46' to the signal A input of the PD 464, the path from signal AWS2 input of the phase calibration unit 46' to the signal B input of the PD 464, and the path from signal AWS3 input of the phase calibration unit 46' to the signal B input of the PD 464, will be substantially the same.

Figure 8:
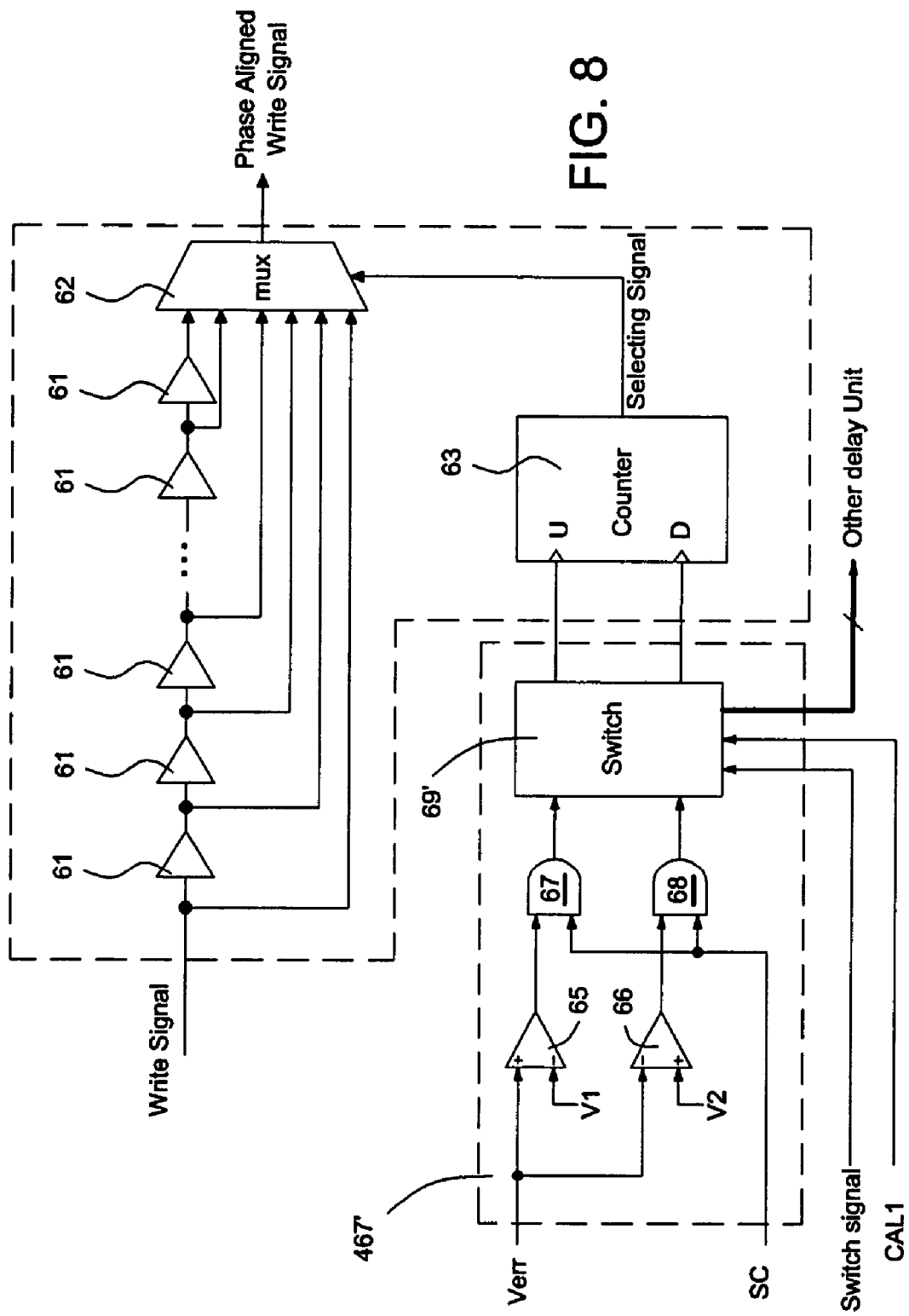
FIG. 8 illustrates a block diagram of the delay unit and the delay time control unit of FIG. 7.

FIG. 8 illustrates a block diagram of the delay unit and the delay time control unit of FIG. 7. The delay time control unit 467' of FIG. 8 is the same as the delay time control unit 467 of FIG. 6 except that the switch 69' of the delay time control unit 467' further receives the control signal CAL1. That is, when phase calibration unit 46' calibrates the phase calibration unit 46' itself, the control signal CAL1 is enabled and the switch 69' will output the phase control signals including the up-counting signal and the down-counting signal to the delay unit of the second alignment unit 462. On the contrary, when the phase calibration unit 46' adjusts the delay time of the first alignment unit 45, the control signal CAL1 is disabled and the switch 69' will output the phase control signals including the up-counting signal and the down-counting signal to the delay unit of the first alignment unit 45.

In addition, because the aligned write signal generator 48 of this embodiment generates three write signals, the phase calibration units in FIGS. 5 and 7 use the switches 463 to switch different signals for calibration. However, if the write signal generator only generates two write signals, the switches 463 of the phase calibration unit of FIGS. 5 and 7 is no longer needed and can be omitted.

Figure 9A:
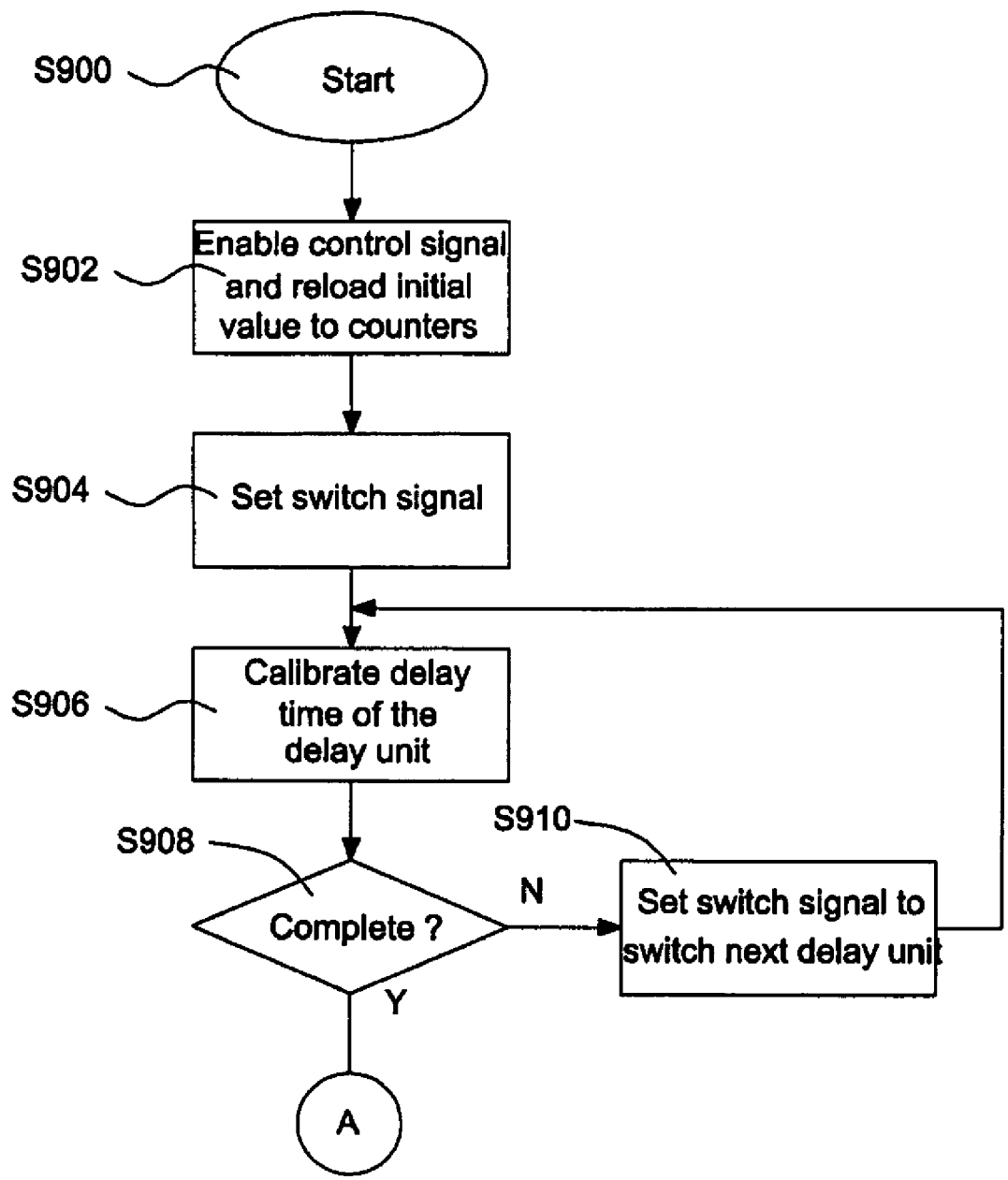
FIG. 9 shows a flow chart of a calibration method for the aligned write signal generator according to the present invention.
Figure 9B:
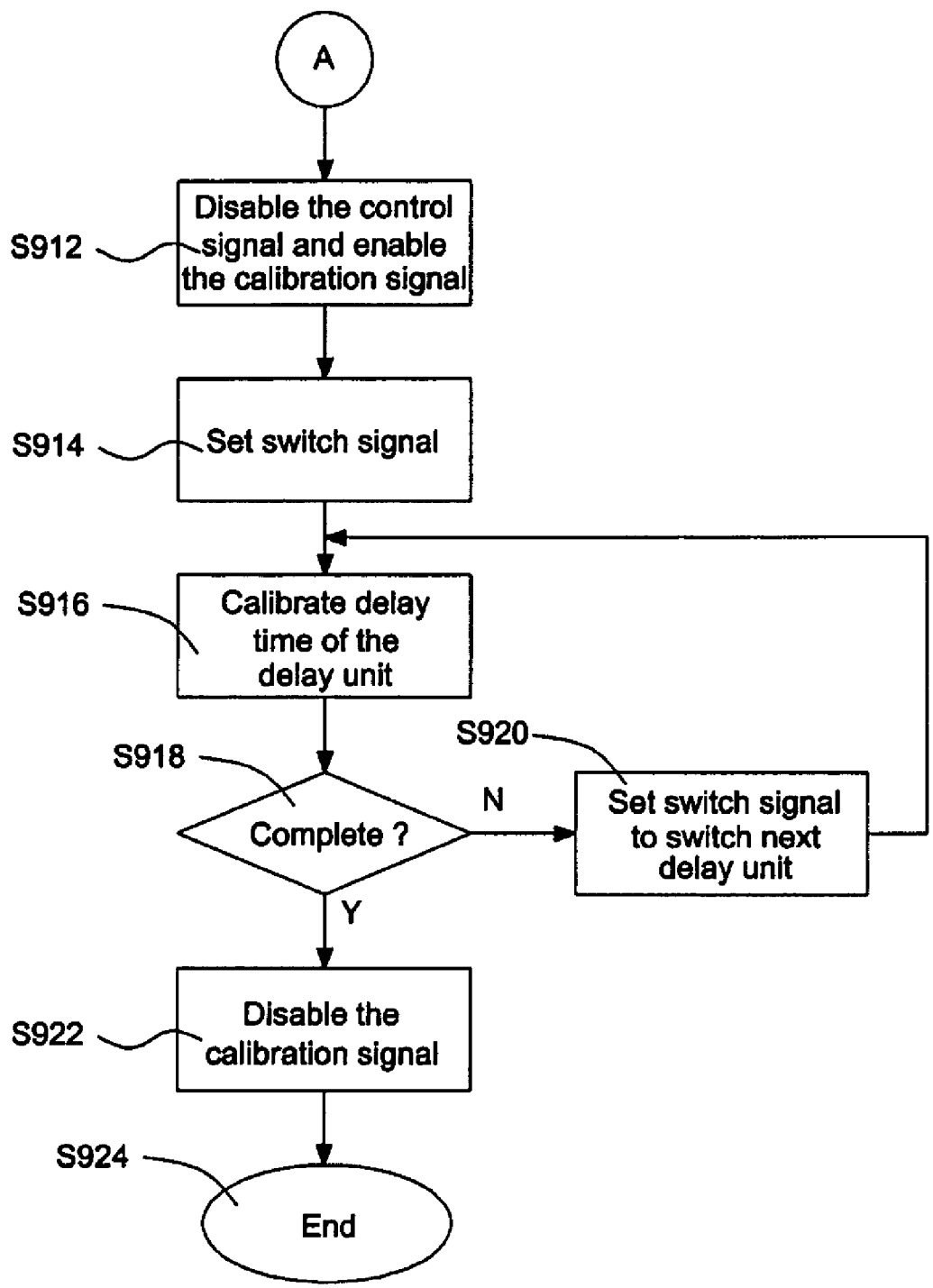

FIG. 9 shows a flow chart of a calibration method for the aligned write signal generator with alignment calibration in an optical disk drive according to the present invention. Referring to FIG. 9, the calibration method for the aligned write signal generator of the invention includes two stages. First stage is to calibrate the delay error of the phase calibration unit itself, and second stage is to calibrate the phase error of the write signal caused by the write signal generator. Thus, in the phase calibration unit 46 shown in the block diagram of FIG. 5, only the second stage is needed because the calibration architecture of the phase calibration unit 46 is not included. The steps of the calibration method of the aligned write signal generator with alignment calibration of the invention will be described with reference to FIG. 9.

Step S900: start the calibration procedure.

Step S902: enable the control signal CAL1 and set an initial value to the counter of each delay unit. Because the control signal CAL1 is enabled, the delay time of the phase calibration unit itself is calibrated.

Step S904: set the switch signal to be a first set of signal. If the number of write signal outputted from the write signal generator exceeds two (three write signals in this embodiment), it is necessary to use the switch to switch the signal to be calibrated. If there are only two write signals outputted from the write signal generator, this step may be omitted.

Step S906: calibrate the delay time of the delay unit of the second alignment unit in the phase calibration unit itself according to the calibration loop.

Step S908: detect whether all of the delay units have been calibrated. If yes, the process jumps to step S912; otherwise the process jumps to step S910.

Step S910: set the switch signal to be a next set of signal to switch next signal to be calibrated and jump back to step S906.

Step S912: disable the control signal CAL1 and enable the calibration signal. Because the control signal is disabled, the calibration of the delay time of the write signal generator is performed. To enable the calibration signal is to ask the EFM encoder to generate the calibration reference clock, such as all of the write signals have substantial the same phase.

Step S914: set the switch signal to be a first set of signal. If the number of write signal outputted from the write signal generator exceeds two (three write signals in this embodiment), it is necessary to use the switch to switch the signal to be calibrated. If there are only two write signals outputted from the write signal generator, this step may be omitted.

Step S916: calibrate the delay time of the delay unit according to the calibration loop.

Step S918: detect whether all of the delay units have been calibrated. If yes, the process jumps to step S922; otherwise the process jumps to step S920.

Step S920: set the switch signal to be a next set of signal to switch next to be calibrated and jumps back to step S916.

Step S922: disable the calibration signal.

Step S924: end the calibration procedure.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art. For example, the phase calibration unit of the embodiment also may be combined with a PLL.

What is claimed is:

1. An aligned write signal generator with alignment calibration, comprising:
   a write signal generator for receiving an EFM signal and converting the EFM signal into a plurality of write signals according to a write strategy waveform generating rule;
   a first alignment unit for receiving the write signals, delaying at least one of the write signals according to a plurality of phase control signals and outputting a plurality of phase adjusted write signals, wherein the first alignment unit generates a plurality of preset phase adjusted write signals at a calibration mode; and
   a phase calibration unit for receiving the preset phase adjusted write signals, and detecting the phase errors among the preset phase adjusted write signals at the calibration mode to adjust the phase control signals, wherein the phase calibration unit outputs the adjusted phase control signals at a normal mode.

2. The aligned write signal generator according to claim 1, wherein the EFM signal is a calibration EFM signal when a calibration signal is enabled, so as to make the write signal generator output the write signals with aligned phase.

3. The aligned write signal generator according to claim 1, wherein the first alignment unit further receives the phase control signals and adjusts delay time of each write signal when the calibration signal is enabled.

4. The aligned write signal generator according to claim 1, wherein the first alignment unit has a plurality of delay units, each of delay units comprises:
   a counter for outputting a count value as a selecting signal;
   a cascaded delay cell module for receiving one of the write signals and outputting a plurality of delayed signals with different delay time; and
   a multiplexer for receiving the delayed signals and selecting one of the delayed signals for output as the phase adjusted write signal according to the selecting signal;
   wherein the counter up-counts or down-counts according to the phase control signals.

5. The aligned write signal generator according to claim 1, wherein the phase calibration unit comprises:
   a phase detector for receiving the phase adjusted write signals and outputting a phase error signal;
   a charge pump for receiving the phase error signal and generating a control current according to the phase error signal;
   an integrator for receiving the control current, integrating the control current, and then generating an error voltage; and
   a delay time control unit for outputting the phase control signals according to the error voltage.

6. The aligned write signal generator according to claim 5, wherein the phase calibration unit further comprises:
   a selection switch for receiving the phase adjusted write signals and selecting two of the phase adjusted write signal to be outputted to the phase detector.

7. The aligned write signal generator according to claim 5, wherein the delay time control unit comprises:
   a first comparator for comparing the error voltage with a first reference voltage and outputting a first comparison signal, wherein the first comparison signal is of high level when the error voltage is higher than the first reference voltage;
   a second comparator for comparing the error voltage with a second reference voltage and outputting a second comparison signal, wherein the second comparison signal is of high level when the error voltage is less than the second reference voltage;
   a first AND gate for receiving the first comparison signal and a trigger clock, and generating an up-counting signal;
   a second AND gate for receiving the second comparison signal and the trigger clock, and generating a down-counting signal; and
   a switch for receiving the up-counting signal and the down-counting signal, and outputting the up-counting signal and the down-counting signal as the phase control signals to one of the delay units according to a switch signal;
   wherein the first reference voltage is higher than or equal to the second reference voltage.

8. The aligned write signal generator according to claim 7, wherein the phase calibration unit further comprises:
   a multiplexer module having a plurality of multiplexers, each of which has a first input terminal and a second input terminal, wherein the first input terminals of the multiplexers receive a calibration clock, the second input terminals of the multiplexers receive the phase adjusted write signal, respectively, and the multiplexer module outputs the calibration clock when a control signal is enabled and outputs the phase adjusted write signal when the control signal is disabled; and
   a second alignment unit comprising a plurality of delay units for respectively receiving the signals outputted from the multiplexer module and outputting signals to the phase detector.

9. The aligned write signal generator according to claim 8, wherein the switch outputs the up-counting signal and the down-counting signal to the delay units of the second alignment unit of the phase calibration unit when the control signal is enabled and outputs the up-counting signal and the down-counting signal to the delay units of the first alignment unit when the control signal is disabled.

10. The aligned write signal generator according to claim 6, wherein the delay time control unit comprises:
   a first comparator for comparing the error voltage with a first reference voltage and outputting a first comparison signal, wherein the first comparison signal is of high level when the error voltage is higher than the first reference voltage;
   a second comparator for comparing the error voltage with a second reference voltage and outputting a second comparison signal, wherein the second comparison signal is of high level when the error voltage is less than the second reference voltage;
   a first AND gate for receiving the first comparison signal and a trigger clock, and generating an up-counting signal;
   a second AND gate for receiving the second comparison signal and the trigger clock, and generating a down-counting signal; and
   a switch for receiving the up-counting signal and the down-counting signal, and outputting the up-counting signal and the down-counting signal as the phase control signals to one of the delay units according to a switch signal;

wherein the first reference voltage is higher than or equal to the second reference voltage.

11. The aligned write signal generator according to claim 10, wherein the phase calibration unit further comprises:

a multiplexer module having a plurality of multiplexers, each of which has a first input terminal and a second input terminal, wherein the first input terminals of the multiplexers receive a calibration clock, the second input terminals of the multiplexers receive the phase adjusted write signal, respectively, and the multiplexer module outputs the calibration clock when a control signal is enabled and outputs the phase adjusted write signal when a control signal is disabled; and a second alignment unit comprising a plurality of delay units for respectively receiving the signals outputted from the multiplexers of the multiplexer module and outputting signals to the phase detector.

12. The aligned write signal generator according to claim 11, wherein the switch outputs the up-counting signal and the down-counting signal to the delay units of the second alignment unit of the phase calibration unit when the control signal is enabled and outputs the up-counting signal and the down-counting signal to the delay units of the first alignment unit when the control signal is disabled.

13. A method for generating phase adjusted write signals in an optical disk drive, the method comprising the steps of:

generating the preset write signal to obtain a plurality of preset phase adjusted write signals at a calibration mode;

detecting the phase errors among the preset phase adjusted write signals at the calibration mode;

adjusting at least one of the preset write signals for a delay time according to the phase errors of the preset phase adjusted write signals at the calibration mode;

obtaining a delay setting at the calibration mode;

receiving an EFM signal;

converting the EFM signal into a plurality of write signals according to a write strategy waveform generating rule; and delaying the write signals according to delay settings for generating the phase adjusted write signals with aligned phase.

14. The method according to claim 13, wherein the step of adjusting the delay settings comprises the steps of:

generating a calibration EFM signal;

converting the calibration EFM signal into the plurality of write signals; and adjusting the delay settings according to the phase difference among the phase adjusted write signals to make the phase of the phase adjusted write signals be substantially aligned.

* * * * *